United States Patent [19]
Asahara et al.

[11] 3,966,447
[45] June 29, 1976

[54] HEAT ABSORBING SEALING METHOD FOR LASER GLASS

[75] Inventors: Yoshiyuki Asahara, Kanagawa; Tetsuro Izumitani, Hino, both of Japan

[73] Assignee: Hoya Glass Works, Ltd., Tokyo, Japan

[22] Filed: Aug. 20, 1974

[21] Appl. No.: 499,097

[30] Foreign Application Priority Data
Aug. 20, 1973  Japan.............................. 48-93078

[52] U.S. Cl. ........................................ 65/40; 65/43; 65/DIG. 4; 106/47 R
[51] Int. Cl.² ................. C03B 23/20; C03B 27/00; C03C 3/00
[58] Field of Search ............. 65/43, 40, 36, DIG. 4; 106/47 R

[56] References Cited
UNITED STATES PATENTS

| | | | |
|---|---|---|---|
| 2,248,644 | 7/1941 | Reger et al. | 65/43 |
| 3,120,433 | 2/1964 | Van Zee | 65/43 |
| 3,254,031 | 5/1966 | DePaolis et al. | 106/47 R |
| 3,420,683 | 1/1969 | Ikeda et al. | 106/47 R |
| 3,778,242 | 12/1973 | Francel et al. | 65/43 |
| 3,814,612 | 6/1974 | Ihoue et al. | 65/59 X |
| 3,881,904 | 5/1975 | Stokes et al. | 65/43 |
| 3,885,974 | 5/1975 | Asahara et al. | 65/43 X |
| 3,907,535 | 9/1975 | Muller | 65/43 X |
| 3,912,482 | 10/1975 | La Grouw et al. | 65/43 |

Primary Examiner—S. Leon Bashore
Assistant Examiner—Frank W. Miga
Attorney, Agent, or Firm—Sughrue, Rothwell, Mion, Zinn & Macpeak

[57] ABSTRACT

A sealing method for a laser glass which provides a high bonding strength comprising applying a powder mixture of (1) a low melting glass containing an infrared absorbing component and (2) a low expansion high melting glass containing an infrared absorbing component to a laser glass and welding the powder mixture to the laser glass by heating.

8 Claims, 1 Drawing Figure

U.S. Patent June 29, 1976 3,966,447
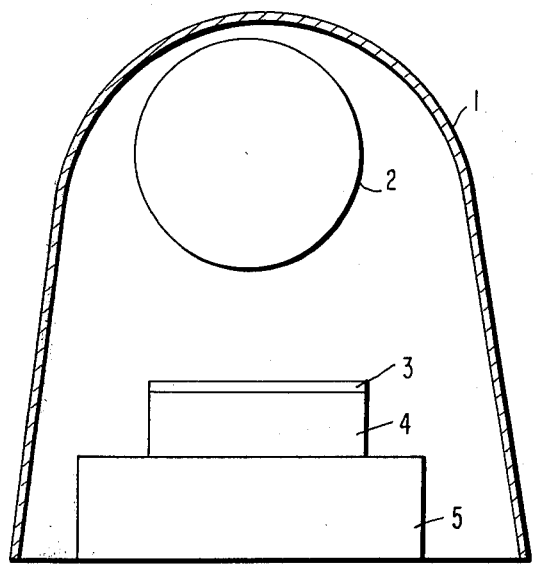

HEAT ABSORBING SEALING METHOD FOR LASER GLASS

BACKGROUND OF THE INVENTION

1. FIELD OF THE INVENTION

The present invention relates to a method of welding a sealing glass to a laser glass and, more particularly, it relates to a sealing method for a laser glass for increasing the bonding strength between the laser glass and the sealing glass and for improving the ability of the glass to absorb infrared rays.

2. DESCRIPTION OF THE PRIOR ART

Recently, it has been reported that the characteristics of a laser can be improved by coating the outside of a laser glass disc with a glass to absorb the light scattered at the inside wall of the laser glass disc. The sealing glass used for this purpose must have properties such that the expansion coefficient of the sealing glass coincides with that of the laser glass as required in a conventional sealing glass and further the sealing glass should be capable of being welded at temperatures lower than the transition point, Tg, of the laser glass in order to not change the characteristics of the laser glass at welding and also the sealing glass should absorb light having definite wave lengths and satisfy sufficiently refractive index requirements. For example, in order to prevent light reflection at the inside wall of a Nd laser glass disc by coating such a sealing glass, the sealing glass must have the ability to absorb light of a wavelength of 1.6 microns, and to prevent light reflection even more effectively, it is desirable that the refractive index of the sealing glass be higher than the refractive index (about 1.6) of an ordinary laser glass but the difference between the refractive indices of the laser glass and the sealing glass be as small as possible. Moreover, in order to not change the characteristics of a laser glass at welding, the sealing glass must have a sealing temperature lower than the Tg (about 450° to 600°C) of the laser glass, that is, the sealing glass must have a softening point, Sp, lower than the Tg of the laser glass by about 100°C.

To meet these requirements, glasses have previously been discovered which have a low refractive index, the ability to absorb infrared rays, a low melting point, and an expansion coefficient, $\alpha$, of $100 \pm 20 \times 10^{-7}/°C$ as described in Japanese Patent application No. 25,565/'73 and U.S. Patent Application Ser. No. 383,743, filed July 30, 1973, now U.S. Pat. No. 3,885,974 issued May 27, 1975. However, since a laser glass is exposed to a xenon flash lamp of 10 kilo joules in a glass laser oscillator, a sealing glass coated on a laser glass is used under quite severe conditions. Therefore, in such a case, a sealing glass consisting of only low melting glass may be destroyed and further the expansion coefficient of the sealing glass must match the expansion coefficient of the laser glass.

SUMMARY OF THE INVENTION

This invention provides a sealing method for a laser glass which comprises applying a powder mixture of (1) a low melting glass containing an infrared absorbing component and (2) a low expansion high melting glass containing an infrared absorbing component to a laser glass and then welding the powder mixture to the laser glass by heating.

BRIEF DESCRIPTION OF THE ACCOMPANYING DRAWING

The FIGURE shows a schematic partial cross sectional view showing the exposure test apparatus used in the example.

DETAILED DESCRIPTION OF THE INVENTION

It has been discovered that by mixing a powder of a low melting point glass, e.g., a $B_2O_3$-$Tl_2O$-$ZnO$ glass, a $B_2O_3$-$PbO$-$ZnO$ glass, etc., satisfying the requirements of a sealing glass for a laser glass and a powder of a high melting low expansion glass containing an infrared absorbing component and by welding this powder mixture, e.g., at a temperature of about 400° to 600°C, to a laser glass, the particles of the low expansion glass are dispersed in the solvent of the fused low melting glass, whereby the expansion coefficient of the sealing glass mixture can be reduced to a value substantially the same as that of or lower than that of the laser glass without degrading the low melting property of the sealing glass. The particles of the glass in the mixture can range in size up to about 100 $\mu$, preferably less than 10 $\mu$.

Therefore, by suitably selecting the mixing ratio of the glasses, which can range from about 50 to 98% by weight of the low melting glass to about 50 to 2% by weight of the high melting low expansion glass, a sealing glass can have an expansion coefficient (5 $\times$ $10^{-7}/°C$) lower than the expansion coefficient of the laser glass and thus a compressive stress is always applied to the side of the sealing glass when the sealing glass is coated on the laser glass, whereby the bonding strength between the laser glass and the sealing glass is increased. Furthermore, if an ordinary low expansion glass is mixed with the low melting glass, the infrared absorbing ability of the low melting glass is decreased by the addition of the low expansion glass and thus the efficiency of absorbing infrared rays of the sealing glass decreases. On the other hand, the low expansion glass itself has the function of absorbing infrared rays in this invention and thus the reduction in infrared absorbing ability by the addition of the low expansion glass can be prevented. Also, since the expansion coefficient of the low expansion glass increases due to the presence of the infrared absorbing component therein, the bonding strength between the laser glass and the sealing glass is lower than the case of using a low expansion glass containing no infrared absorbing component but the bonding strength in the case of using the low expansion glass containing the infrared absorbing component is still sufficient to endure severe conditions. Suitable low melting glasses which can be used in this invention are described in U.S. Patent application Ser. No. 383,743, filed July 30, 1973 now U.S. Pat. No. 3,885,974 issued May 27, 1975. Suitable infrared absorbing components include, e.g., $V_2O_5$, $Fe_2O_3$, etc., in an amount of about 5 to 18 mol% of the total composition.

The invention is explained more specifically by reference to the following example. Unless otherwise indicated, all parts and percents are by weight.

A powder mixture having a particle size of less than 10 $\mu$ of a low melting glass (A) comprising 40.4% by weight $P_2O_5$, 36.7% by weight PbO, 13.2% by weight $Ag_2O$, and 9.7% by weight $V_2O_5$ and having an expansion coefficient, $\alpha$, of $115 \times 10^{-7}/°C$ and a softening point, Sp, of 355°C; glass ($B_1$) comprising 76.7% by weight $SiO_2$, 11.2% by weight $B_2O_3$, 1.9% by weight $Al_2O_3$, 4.2% by weight $Na_2O$, 0.2% by weight $K_2O$, 0.1% by weight MgO, 0.3% by weight CaO, 0.7% by weight $As_2O_3$, and 4.8% by weight $Fe_2O_3$ and having an expansion coefficient, $\alpha$, of $37.3 \times 10^{-7}/°C$; glass ($B_2$) comprising 73.2% by weight $SiO_2$, 10.7% by weight $B_2O_3$, 1.8% by weight $Al_2O_3$, 4.0% by weight $Na_2O$, 0.2% by weight MgO, 0.3% by weight CaO, 0.6% by weight $As_2O_3$, and 9.1% by weight $Fe_2O_3$ and having an expansion coefficient, $\alpha$, of $37.7 \times 10^{-7}/°C$; and glass (C) comprising 11.8% by weight $B_2O_3$, 80.5% by weight $SiO_2$, 2.0% by weight $Al_2O_3$, 4.4% by weight $Na_2O$, 0.2% by weight $K_2O$, 0.1% by weight MgO, 0.5% by weight CaO, and 0.7% by weight $As_2O_3$ and having an expansion coefficient, $\alpha$, of $32 \times 10^{-7}/°C$; in the specific ratio as shown in the following table was coated on a laser glass having an expansion coefficient, $\alpha$, of $105 \times 10^{-7}/°C$ using an organic solvent such as a mixture of amyl acetate and nitrocellulose or acetone and welded thereto by heating to 460° to 480°C.

The sample thus prepared was exposed 1 to 10 times to a xenon flash lamp of about 6 kilo joules using the device as illustrated in the accompanying drawing.

In the FIGURE, laser glass 4 having sealing glass 3 bonded or welded thereon is placed on glass support 5 and xenon flash lamp 2 is located above the laser glass. The entire system is placed in aluminum cover 1.

The results obtained are shown in the following table.

| Sample No. | Glass Mixing Ratio (%) A | $B_1$ | $B_2$ | C | Exposure Times 1 Time | 5 Times | 10 Times |
|---|---|---|---|---|---|---|---|
| 1 | 100 | — | — | — | Flaked off | Completely flaked off | — |
| 2 | 80 | 20 | — | — | Not flaked off | Partially flaked off | Greatly flaked off |
| 3 | 80 | — | 20 | — | " | Not flaked off | Not flaked off |
| 4 | 80 | — | — | 20 | " | " | " |
| 5 | 100 | — | — | — | Partially flaked off | Completely flaked off | — |
| 6 | 80 | 20 | — | — | Not flaked off | Not flaked off | Partially flaked off |
| 7 | 80 | — | 20 | — | " | " | Not flaked off |
| 8 | 80 | — | — | 20 | " | " | " |

In addition, in the above test, Samples 1 to 4 were exposed at a distance of 3 cm from the flash lamp and Samples 5 to 8 were exposed at a distance of 6 cm from the flash lamp.

In the above table, Samples 1 and 5 were the cases of using only the low melting point glass (comparison test), Samples 4 and 8 were the cases of using a mixture of the low melting glass and an ordinary low expansion glass which did not contain the infrared absorbing component (comparison test), and Samples 2, 3, 6 and 7 were the cases of using a mixture of the low melting glass and the low expansion glass containing $Fe_2O_3$ as an infrared absorbing component (samples of this invention).

It can be understood from the above results that the bonding strength was higher in the samples of this invention than in the case of using simply the low melting glass. Furthermore, by adding the low expansion glass to the low melting glass, the proportion of the low melting glass having the infrared absorbing ability decreased but since the low expansion glass itself had an infrared absorbing ability in this invention, a reduction in infrared absorbing ability of the sealing glass was prevented.

While the invention has been described in detail and with reference to specific embodiments thereof, it will be apparent to one skilled in the art that various changes and modifications can be made therein without departing from the spirit and scope thereof.

We claim:

1. A sealing method for a laser glass which comprises applying a powder mixture of (1) a low melting glass containing an infrared absorbing component and (2) a low expansion high melting glass containing an infrared absorbing component to an Nd laser glass and then welding the powder mixture to the laser glass by heating.

2. The sealing method of claim 1, wherein the proportion by weight of the low melting glass to the high melting glass ranges from about 98:2 to 50:50.

3. The sealing method of claim 1, wherein the welding of the glass mixture to the laser glass is by heating to a temperature of from about 400° to 600°C.

4. The sealing method of claim 1, wherein the particles of the powder mixture have a size of not above 100 $\mu$.

5. The sealing method of claim 1, wherein said infrared absorbing component is at least one of $V_2O_5$ and $Fe_2O_3$.

6. The sealing method of claim 1, wherein said infrared absorbing component is present in said glass in an amount of from about 5 to 18 mol%.

7. The sealing method of claim 1, wherein upon welding by heating the powder of the low expansion high melting glass is dispersed in the low melting glass which is fused at the welding temperature, whereby the expansion coefficient of the resulting sealing glass mixture is reduced to a value no greater than substantially the same as that of the laser glass.

8. The sealing method of claim 7, wherein the expansion coefficient of the sealing glass mixture is reduced to a value lower than that of the laser glass.

* * * * *